United States Patent [19]

Knodel

[11] Patent Number: 4,838,039

[45] Date of Patent: Jun. 13, 1989

[54] DIRECT CONTACT EVAPORATOR/FREEZER

[75] Inventor: Bryan D. Knodel, Plainfield, Ill.

[73] Assignee: CBI Research Corporation, Plainfield, Ill.

[21] Appl. No.: 184,272

[22] Filed: Apr. 21, 1988

Related U.S. Application Data

[63] Continuation-in-part of Ser. No. 919,986, Oct. 17, 1986, abandoned.

[51] Int. Cl.⁴ .............................................. F25D 13/00
[52] U.S. Cl. ....................................... 62/330; 62/123; 62/434; 62/534
[58] Field of Search .................. 62/123, 533, 534, 541, 62/74, 434, 330

[56] References Cited

U.S. PATENT DOCUMENTS

| | | | |
|---|---|---|---|
| 2,020,719 | 11/1935 | Bottoms | 62/74 |
| 3,188,825 | 6/1965 | Van Olphen | 62/123 |
| 3,247,678 | 4/1966 | Mohlman | 62/534 X |
| 3,298,612 | 1/1967 | Torrens | 62/74 X |
| 3,501,924 | 3/1970 | Ashley | 62/123 |
| 3,813,892 | 6/1974 | Johnson et al. | 62/534 |
| 4,488,407 | 12/1984 | Delano | 62/74 |
| 4,584,843 | 4/1986 | Pronger, Jr. et al. | 62/434 X |
| 4,596,120 | 6/1986 | Knodel et al. | 62/123 X |

Primary Examiner—William E. Tapoical
Attorney, Agent, or Firm—Marshall, O'Toole, Gerstein, Murray & Bicknell

[57] ABSTRACT

A direct contact evaporator-freezer comprising a body defining a chamber having an upper vapor discharge opening and a lower aqueous slurry discharge opening; a conduit to supply an aqueous liquid to the chamber at a rate which produces a pool of liquid in the chamber while aqueous slurry is discharged therefrom; and a nozzle to spray a liquid refrigerant in the form of small high velocity droplets into the aqueous liquid in the chamber.

24 Claims, 2 Drawing Sheets

DIRECT CONTACT EVAPORATOR/FREEZER

This application is a continuation-in-part of pending application Ser. No. 919,986 filed Oct. 17, 1986, now abandoned.

This invention relates to apparatus and methods of producing ice from aqueous liquids. More particularly, this invention is concerned with apparatus and methods of producing ice by directly contacting an aqueous liquid with a refrigerant.

BACKGROUND OF THE INVENTION

The production of ice in aqueous liquids has many useful purposes. Thus, ice can be produced and used immediately, or the ice can be stored and used later, for cooling purposes. Also, in the production of potable water, sea water and brackish water can be cooled to produce ice, the ice separated and then melted to give the desired fresh water. Fruit and vegetable juices are also concentrated by cooling them to produce ice and then separating the ice from the concentrated juice.

The production of ice for the described purposes, as well as others, can be achieved in a number of ways including indirect heat transfer in a shell and tube freeze exchanger. A refrigerant can be used as the cooling medium on the shell side of the freeze exchanger. This method is disclosed in U.S. Pat. No. 4,286,436.

Another method of producing ice is to directly contact the aqueous liquid with a refrigerant. Direct contact heat transfer requires less temperature difference between the vaporizing refrigerant and freezing solution than does indirect heat transfer systems to achieve the same energy transfer due to the elimination of the heat exchanger surface. However, the exact temperature difference required in the direct contact heat exchanger will depend upon several factors including the properties of the two fluids, the ratio of the two fluids and agitation. This method, as well as apparatus useful therefor, is disclosed in U.S. Pat. Nos. 3,017,751; 3,017,752; 3,259,181; 3,835,658; 3,885,399; 4,046,534 and 4,596,120. After the ice is produced it is separated and then discarded, melted and used as potable water or melted to recover stored refrigeration. The refrigerant used for cooling and ice formation is recovered to the extent possible and then reused in the process.

Experience has shown that the refrigerant feeding device used for feeding the refrigerant into the aqueous liquid body has a tendency to clog due to the formation of ice on and around the feeding device and orifice through which the refrigerant flows and expands. To prevent these ice formations it has been proposed to apply resistant heating to the refrigerant feeding device as shown in U.S. Pat. No. 3,672,182. The use of resistance heating represents a persistent energy consumption. Accordingly, it would be desirable in the production of ice, by directly contacting an aqueous liquid with a refrigerant, if the refrigerant feeding device could be maintained free of ice without the use of additional energy.

Experience has also shown that a significant amount of refrigerant is lost in direct contact methods because refrigerant vapor and liquid is encapsulated or entrapped in the ice crystals. When the ice is later melted or disposed of, some or most of the encapsulated refrigerant is lost. Additionally, encapsulation of the refrigerant constitutes an economic loss of potential cooling capacity which would otherwise produce additional ice. Accordingly, it would be desirable in the production of ice, by directly contacting an aqueous liquid with a refrigerant, if refrigerant encapsulation in the ice could be reduced and even substantially eliminated.

The subject invention provides improved apparatus for preventing ice formation on refrigerant feeding devices and preventing or reducing encapsulation of refrigerant in the ice.

SUMMARY OF THE INVENTION

According to a first aspect of the invention there is provided a direct contact evaporator-freezer comprising a body defining a chamber having an upper vapor discharge opening and a lower aqueous slurry discharge opening; means to supply an aqueous liquid to the chamber at a rate which produces a pool of liquid in the chamber to maintain the fluidity of the aqueous slurry, such that the aqueous slurry can flow therefrom; and means to feed a liquid refrigerant in the form of small high velocity droplets into the aqueous liquid in the chamber.

The means to supply aqueous liquid to the chamber can include at least one conduit in communication with the chamber. Desirably, at least two said conduits are in communication with the chamber from opposite horizontal positions to achieve symmetrical flow distribution thus ensuring uniform agitation of the slurry to prevent blockage of the evaporator-freezer which could otherwise be caused by local areas of low velocity aqueous liquid.

The means to feed a liquid refrigerant into the pool of aqueous liquid can comprise at least one nozzle in the chamber, with said nozzle having an orifice through which liquid refrigerant sprays as high velocity droplets into the aqueous liquid. A plurality of such so positioned nozzles can be located in the chamber, desirably symmetrically located with respect to the chamber so that the refrigerant sprays are symmetrically directed into the aqueous liquid in the chamber. A plurality of nozzles can communicate with the same liquid refrigerant supply and distribution manifold.

The liquid refrigerant is desirably fed to the nozzle at a temperature above 32° F. and is flashed to a reduced temperature and pressure as the refrigerant passes through the nozzle.

The chamber vapor discharge opening and the chamber lower aqueous slurry discharge opening desirably are substantially vertically positioned. They can have a substantially common vertical axis. The vapor is thus discharged upwardly from the chamber while the aqueous slurry is simultaneously discharged downwardly from the chamber.

According to a second aspect of the invention, apparatus is provided for producing an aqueous slurry of ice particles comprising an insulated storage tank for an aqueous slurry of ice particles; a direct contact evaporator-freezer positioned in the upper interior space of the tank above a predetermined maximum level of slurry to be stored in the tank; the contact evaporator-freezer comprising a body defining a chamber having an upper vapor discharge opening and a lower aqueous slurry discharge opening; means to supply an aqueous liquid to the chamber at a rate which produces a pool of liquid in the chamber to maintain the fluidity of the aqueous slurry, such that the aqueous slurry can flow therefrom; and means to feed a liquid refrigerant in the form of a spray of small high velocity droplets into the aqueous liquid in the chamber.

The contact evaporator-freezer can have structural features as summarized above.

DETAILED DESCRIPTION OF THE INVENTION

To the extent it is reasonable and practical the same or similar elements which appear in the various views of the drawings will be identified by the same numbers.

Figure 1:
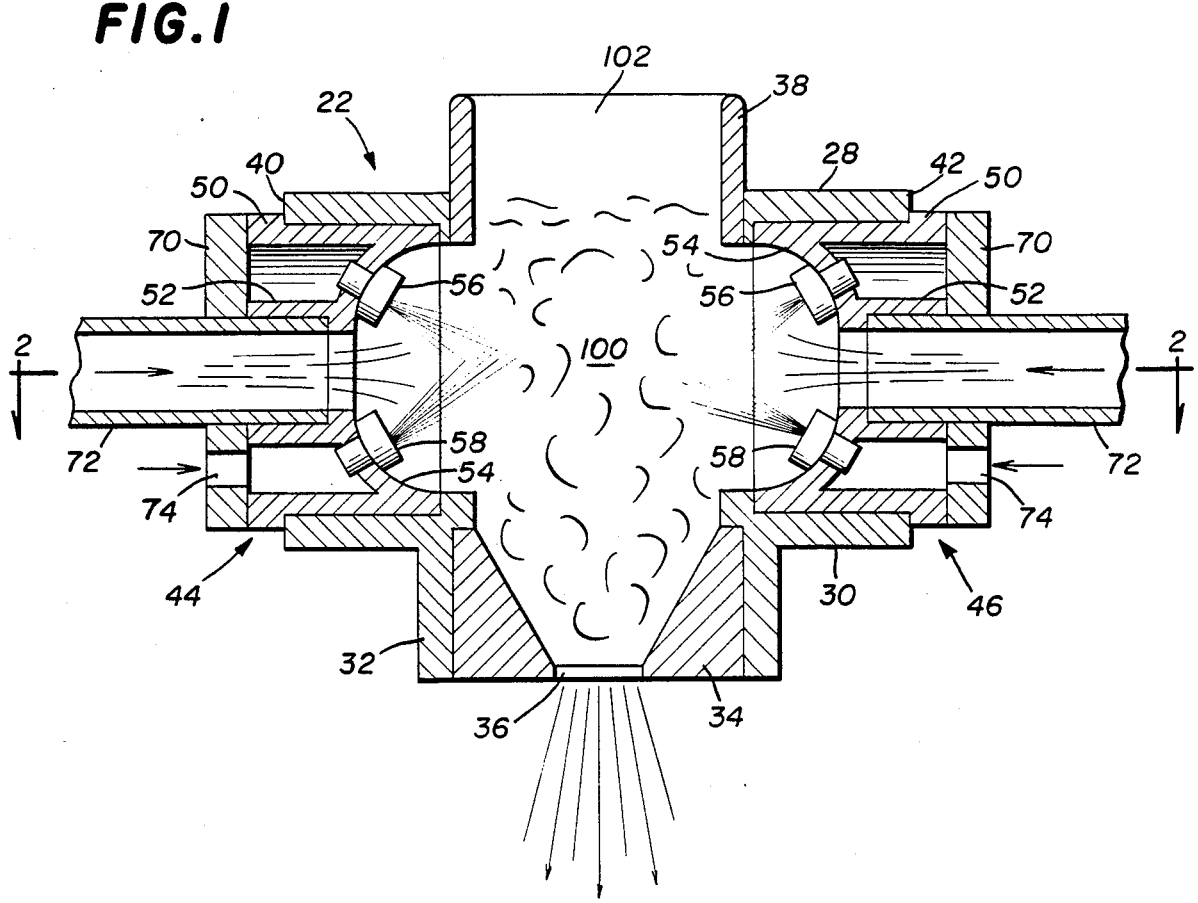
FIG. 1 is a vertical sectional view of a direct contact evaporator-freezer provided by the invention.
Figure 2:
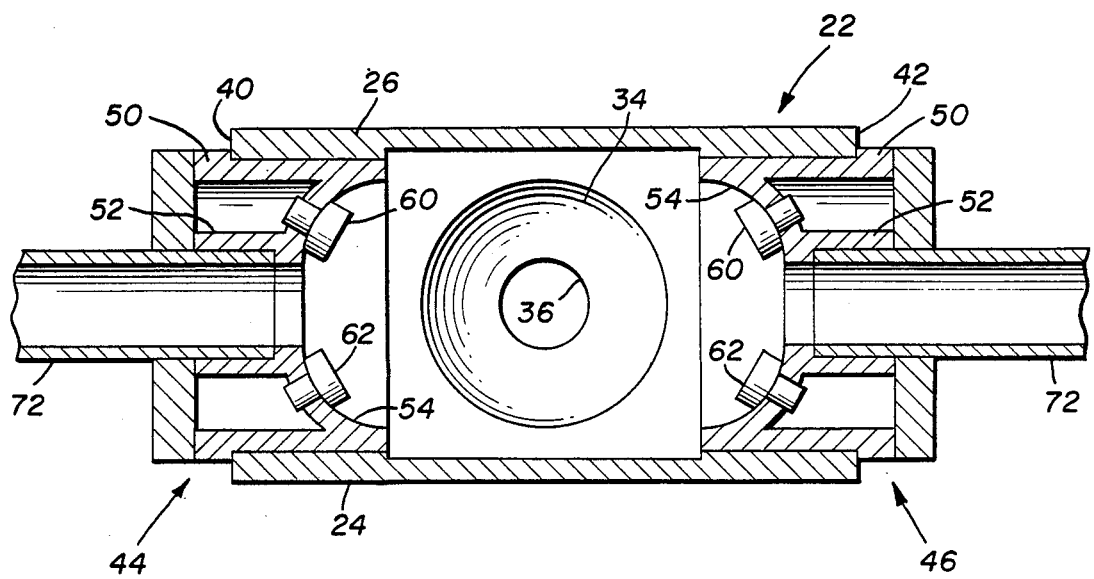
FIG. 2 is a sectional view taken along the line 2—2 of FIG. 1.

With reference to FIGS. 1 and 2 the direct contact evaporator-freezer 20 has a body 22 comprising a rectangular shaped structure having vertical flat opposing parallel side walls 24,26, a flat horizontal top 28 and a flat bottom 30. Projecting downwardly from flat bottom 30 is a square extension 32 having an axial circular bore in which nozzle insert 34 having orifice 36 is positioned. Vertical circular sleeve 38 is positioned in a circular bore in top 28.

The opposing ends 40,42 of body 22 have identical horizontal circular bores which receive identical fluid supply elements 44,46. Each of the elements 44,46 has an outer cylindrical shell 50 and an axially arranged inner cylindrical shell 52 which are integrally joined to a dished inner wall 54. Four nozzle members 56,58,60,62 are set into holes in each wall 54.

The outer end of each element 44,46 is closed by a circular cover 70 having a centrally located hole through which conduit 72 extends into the inside of shell 52. The conduits 72 provide means for water to be supplied to the chamber 100 in the middle of body 22.

Each of the covers 70 is provided with a hole 74 therethrough for supplying a liquefied refrigerant into the space between the cylindrical shells 50,52. The said space functions as a manifold for feeding the refrigerant through the nozzle members 56,58,60,62 into the chamber 100 and into a pool of water and ice crystals in the chamber.

When the liquefied refrigerant is sprayed out of nozzle members 56,58,60,62 it forms very fine high velocity droplets which disperse in the aqueous liquid in chamber 100. The two fluids mix with cooling of the water and formation of ice crystals and vaporization of the refrigerant. The refrigerant vapor is discharged upwardly through vapor outlet sleeve 38 and simultaneously the mixture of aqueous liquid and ice crystals is discharged downwardly as a slurry from chamber 100 out orifice 36.

The described apparatus overcomes encapsulation of liquid refrigerant within the crystal structure of the ice as a result of the small size and high velocity of the refrigerant droplets. Additionally, the droplets have a very large surface area to volume ratio thus providing high heat transfer coefficients which allow the refrigerant to completely vaporize very rapidly, preventing the ice from building around it.

The nozzles 56,58,60,62 can also aid in preventing ice-up problems by being incorporated as the expansion devices in the vapor compression cycle. In this system the high pressure refrigerant within the spray device is quite warm, specifically at or near the condensing temperature which is typically around 100° F. This results in a warm nozzle and prevents any ice build-up on the outside which could otherwise clog the apparatus.

Thorough mixing and the required energy transfer are achieved in the mixing/reacting chamber 100. In this chamber a four phase mixture of refrigerant vapor, aqueous liquid, ice crystals and atomized liquid refrigerant is self agitated by the swirling, churning nature of the flow in and from the chamber.

The resulting refrigerant vapors naturally rise vertically and exit the mixing/reacting chamber through the vapor outlet 102. Similarly, the ice slurry exits downwardly from the mixing/reacting chamber 100 through the orifice 36 in the bottom. The orifice 36 is sized to provide the desired liquid retention, so that the chamber always contains a pool of liquid, and also so as to establish the desired back pressure within the mixing/reacting chamber 100.

Figure 3:
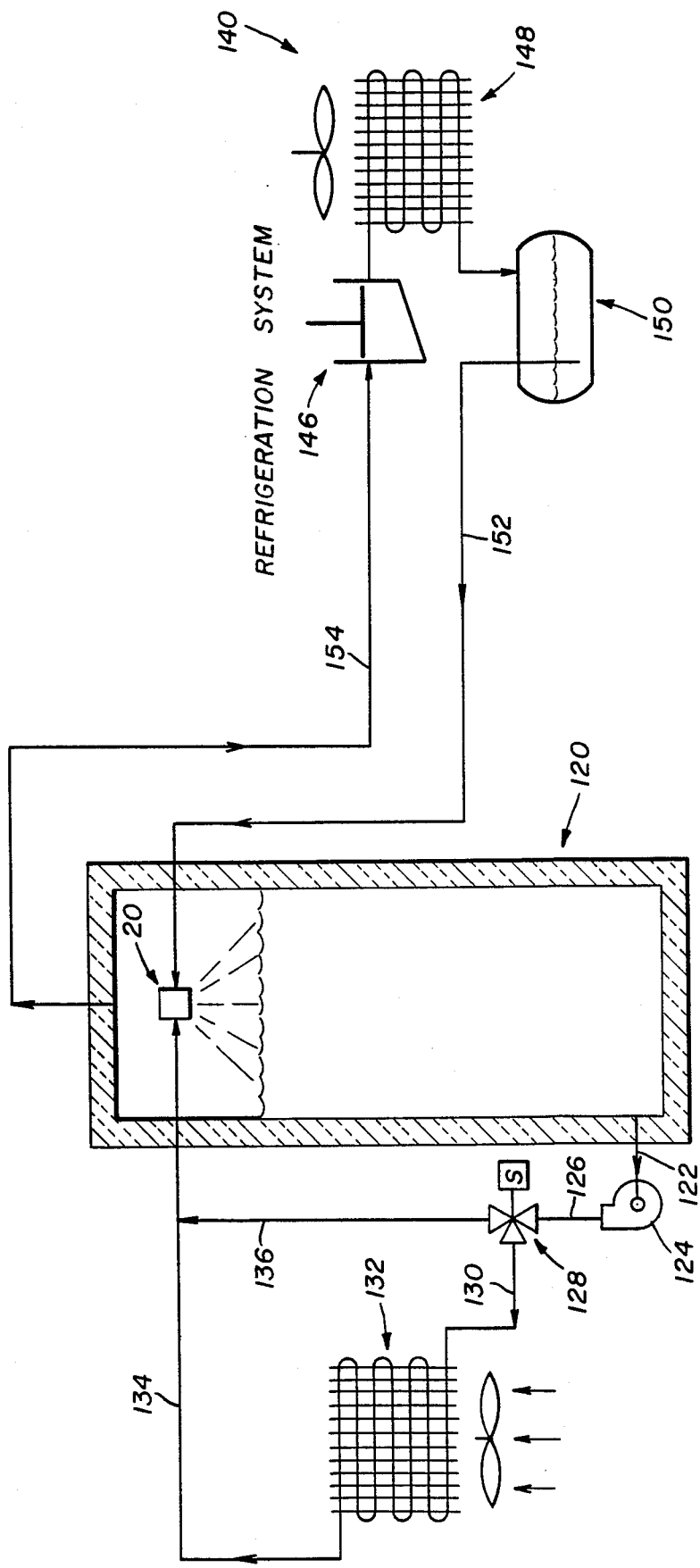
FIG. 3 is a schematic drawing illustrating a further aspect of the invention with the direct contact evaporator-freezer of FIGS. 1 and 2 positioned in an ice slurry storage tank.

FIG. 3 illustrates apparatus for producing an ice slurry using the direct contact evaporator-freezer 20 positioned in the upper portion of insulated storage tank 120. The apparatus illustrated schematically in FIG. 3 includes a refrigeration loop or cycle 140 having a refrigerant compressor 146, a refrigerant condenser 148 and receiver 150. The liquefied refrigerant is fed from receiver 150 to the evaporator-freezer 20 by conduit 152 which feeds it to openings 74. Vapor released from the evaporator-freezer 20 accumulates in the upper portion of tank 120 and is withdrawn therefrom by conduit 154 which returns it, after removal of water as may be appropriate, to compressor 146.

The slurry exiting the evaporator-freezer 20 is distributed directly over the liquid surface within the storage tank 120 eliminating any additional slurry handling. When the refrigerant vapors exiting the apparatus flow into the vapor space above the liquid in the storage tank, water which may have been entrained with the flow of vapor is largely knocked out before the vapor is drawn off to the compressor 146.

The cooling capacity of the cold aqueous liquid and/or ice in tank 120 can be utilized for any cooling purpose, including air conditioning. Cold water or an ice slurry can be withdrawn from tank 120 by conduit 122 and fed to pump 124 which feeds it to conduit 126 for delivery to three way valve 128. With valve 128 appropriately set the liquid is fed to conduit 130 which feeds it to heat exchanger 132. The cold water or ice slurry flows in indirect heat exchange with a warm fluid such as external air which is cooled and used for cooling. The water, thereby warmed, is withdrawn from heat exchanger 132 by conduit 134 and fed to evaporator-freezer 20 to be cooled again.

At such time as it is appropriate valve 128 can be set to feed water to conduit 136, instead of conduit 130, to feed it to conduit 134 and then to evaporator-freezer 20 to produce additional ice for storage in tank 120.

The foregoing detailed description has been given for clearness of understanding only, and no unnecessary limitations should be understood therefrom, as modifications will be obvious to those skilled in the art.

What is claimed is:

1. A direct contact evaporator-freezer comprising:
   a body defining a chamber having an upper vapor discharge opening and a lower aqueous slurry discharge opening;
   means to supply an aqueous liquid to the chamber at a rate which produces a pool of liquid in the chamber to maintain fluidity of an aqueous slurry produced therein, such that the aqueous slurry can flow therefrom; and means in close proximity to the pool to feed a liquid refrigerant in the form of small high velocity droplets into the pool of aqueous liquid in the chamber.

2. A direct contact evaporator-freezer according to claim 1 in which the means to supply aqueous liquid to the chamber includes at least one conduit in communication with the chamber.

3. A direct contact evaporator-freezer according to claim 1 in which:

the means to feed a liquid refrigerant into the pool of aqueous liquid comprises at least one nozzle in the chamber and positioned to be above the pool of aqueous liquid, with said nozzle having an orifice through which liquid refrigerant sprays as high velocity droplets.

4. A direct contact evaporator-freezer according to claim 3 in which a plurality of such so positioned nozzles are located in the chamber.

5. A direct contact evaporator-freezer according to claim 3 in which the liquid refrigerant enters the nozzle at a temperature above 32° F. and is flashed to a reduced temperature and pressure as the refrigerant passes through the nozzle.

6. A direct contact evaporator-freezer according to claim 1 in which the vapor discharge opening and the lower aqueous slurry discharge opening are substantially vertically positioned.

7. Apparatus for producing an aqueous slurry of ice particles comprising;

an insulated storage tank for an aqueous slurry of ice particles;

a direct contact evaporator-freezer positioned in the upper interior space of the tank above a predetermined maximum level of slurry to be stored in the tank;

the contact evaporator-freezer comprising:

a body defining a chamber having an upper vapor discharge opening and a lower aqueous slurry discharge opening;

means to supply an aqueous liquid to the chamber at a rate which produces a pool of liquid which fills the chamber to maintain the fluidity of the aqueous slurry, such that the aqueous slurry can flow therefrom; and means to feed a liquid refrigerant in the form of small high velocity droplets into the pool of aqueous liquid in the chamber.

8. Apparatus according to claim 7 in which the means to supply aqueous liquid to the chamber includes at least one conduit in communication with the chamber.

9. Apparatus according to claim 8 in which at least two said conduits are in communication with the chamber from opposite horizontal positions to achieve symmetrical flow distribution thus ensuring uniform agitation of the slurry to prevent blockage of the evaporator-freezer which otherwise can be caused by local areas of low velocity.

10. Apparatus according to claim 7 in which:

the means to feed a liquid refrigerant into the pool of aqueous liquid comprises at least one nozzle in the chamber and it is positioned to be above the pool of aqueous liquid, with said nozzle having an orifice through which liquid refrigerant sprays as high velocity droplets.

11. Apparatus according to claim 10 in which a plurality of such so positioned nozzles are located in the chamber.

12. Apparatus according to claim 7 in which the vapor discharge opening and the lower aqueous slurry discharge opening are substantially vertically positioned.

13. Apparatus according to claim 12 in which both discharge openings have a substantially common vertical axis.

14. Apparatus according to claim 11 in which a plurality of nozzles communicate with a liquid refrigerant supply and distribution manifold.

15. A direct contact evaporator-freezer comprising:

a body defining a chamber having an upper vapor discharge opening and a lower aqueous slurry discharge opening;

at least two conduits in communication with the chamber from opposite horizontal positions which can supply aqueous liquid to the chamber at a rate which produces a pool of liquid in the chamber to maintain the fluidity of the aqueous slurry and to achieve symmetrical flow distribution thus ensuring uniform agitation of the slurry to prevent blockage or the evaporator-freezer which otherwise can be caused by locate areas of low velocity, such that the aqueous slurry can low therefor; and means to feed a liquid refrigerant in the form of small high velocity droplets into the aqueous liquid in the chamber.

16. A direct contact evaporator-freezer comprising:

a body defining a chamber having an upper vapor discharge opening and a lower aqueous slurry discharge opening;

means for supply an aqueous liquid to the chamber at a rate which produces a pool of liquid in the chamber to maintain the fluidity of the aqueous slurry, such that the aqueous slurry can flow therefrom;

means to feed a liquid refrigerant in the form of small high velocity droplets into the pool of aqueous liquid in the chamber comprising a plurality of nozzles in the chamber positioned to be above the pool of aqueous liquid, with said nozzle having an orifice through which liquid refrigerant can spray as high velocity droplets; and the nozzles being in communication with a common liquid refrigerant supply and distribution manifold.

17. A direct contact evaporator-freezer according to claim 16 in which both discharge openings have a substantially common vertical axis.

18. Apparatus for producing an aqueous slurry of ice particles comprising:

a tank;

a direct contact evaporator-freezer positioned in the tank;

the contact evaporator-freezer comprising:

a body defining a chamber having an upper vapor discharge opening and a lower aqueous slurry discharge opening;

means to supply an aqueous liquid to the chamber at a rate which produces a pool of liquid which fills the chamber to maintain the fluidity of the aqueous slurry such that the aqueous slurry can flow therefrom; and means to feed a liquid refrigerant in the form of small high velocity droplets into the pool of aqueous liquid in the chamber.

19. Apparatus according to claim 18 in which at least two said conduits are in communication with the chamber from opposite horizontal positions to achieve symmetrical flow distribution thus ensuring uniform agitation of the slurry to prevent blockage of the evaporator-freezer which otherwise can be caused by local areas of low velocity.

20. Apparatus according to claim 18 in which:
the means to feed a liquid refrigerant into the pool of aqueous liquid comprises at least one nozzle in the chamber and it is positioned to be above the pool of aqueous liquid, with said nozzle having an orifice through which liquid refrigerant sprays as high velocity droplets.

21. Apparatus according to claim 20 in which a plurality of such so positioned nozzles are located in the chamber.

22. Apparatus according to claim 18 in which the vapor discharge opening and the lower aqueous slurry discharge opening are substantially vertically positioned.

23. Apparatus according to claim 22 in which both discharge openings have a substantially common vertical axis.

24. Apparatus according to claim 21 in which a plurality of nozzles communicate with a common liquid refrigerant supply and distribution manifold.

* * * * *

UNITED STATES PATENT AND TRADEMARK OFFICE
CERTIFICATE OF CORRECTION

PATENT NO. : 4,838,039
DATED : June 13, 1989
INVENTOR(S) : BRYAN DALE KNODEL

It is certified that error appears in the above-identified patent and that said Letters Patent is hereby corrected as shown below:

Column 6, line 25, change "or" to -- of --; line 27, change "low therefor" to -- flow therefrom --; line 35, change "for" to -- to --.

Signed and Sealed this

Sixth Day of February, 1990

Attest:

JEFFREY M. SAMUELS

Attesting Officer    Acting Commissioner of Patents and Trademarks